United States Patent [19]
Bartesch et al.

[11] Patent Number: 4,779,845
[45] Date of Patent: Oct. 25, 1988

[54] GAS SPRING FOR MOTOR VEHICLE WITH RETAINING DRIVE FOR PREVENTING PISTON ROD RETURN TOWARD ITS OPERATIONAL, OUTERMOST POSITION AFTER ACCIDENT

[75] Inventors: Hans-Georg Bartesch, Grafenau; Volker Nickel, Sindelfingen; Manfred Müller, Deizisau; Herbert Freitag, Koblenz; Klaus Schnitzius, Rheinbrohl, all of Fed. Rep. of Germany

[73] Assignees: Daimler-Benz AG, Stuttgart-Unterturkheim; Stabilus GmbH, Koblenz-Neuendorf, both of Fed. Rep. of Germany

[21] Appl. No.: 452,419

[22] Filed: Apr. 18, 1983

[51] Int. Cl.[4] ............................ E05F 5/14; E05F 7/06; E05D 17/00; F16F 9/02; B62D 25/12
[52] U.S. Cl. ..................................... 267/120; 188/300; 267/64.12; 267/124; 292/338; 296/189; 296/76
[58] Field of Search ...................... 267/120, 64.12, 124, 267/64.11, 64.22, 64.26; 296/189, 56, 76; 292/278, 338, 268, 339; 188/300, 67; 16/66

[56] References Cited
U.S. PATENT DOCUMENTS

| 3,883,126 | 5/1975 | Nicholls . | |
|---|---|---|---|
| 3,963,101 | 6/1976 | Stadelmann et al. | 267/64.12 X |
| 4,070,050 | 1/1978 | Glock et al. | 292/339 |
| 4,078,779 | 3/1978 | Mölders | 267/120 |
| 4,118,131 | 10/1978 | Schnitzins | 267/120 X |
| 4,156,523 | 5/1979 | Bauer | 267/120 |
| 4,240,619 | 12/1980 | Wirges et al. | 267/120 X |
| 4,307,874 | 12/1981 | Reuschenbach et al. | 267/124 X |
| 4,309,027 | 1/1982 | Mölders et al. | 267/124 |
| 4,452,437 | 6/1984 | Lochner | 267/64.22 |
| 4,595,182 | 6/1986 | Freitag et al. | 267/64.12 X |
| 4,634,170 | 1/1987 | Lach | 267/64.12 X |
| 4,702,463 | 10/1987 | Krautkrämer | 267/64.26 |
| 4,723,765 | 2/1988 | Pearson | 267/64.12 |

FOREIGN PATENT DOCUMENTS

| 2457938 | 6/1976 | Fed. Rep. of Germany . |
| 2619176 | 11/1977 | Fed. Rep. of Germany . |
| 7833144 | 1/1979 | Fed. Rep. of Germany . |
| 2851366 | 6/1980 | Fed. Rep. of Germany . |
| 3151070 | 8/1983 | Fed. Rep. of Germany . |
| 2007955 | 1/1970 | France . |
| 2214839 | 8/1974 | France . |
| 2243372 | 4/1975 | France . |
| 1189942 | 4/1970 | United Kingdom . |
| 1231670 | 5/1971 | United Kingdom . |
| 1415257 | 11/1975 | United Kingdom . |
| 1442735 | 7/1976 | United Kingdom . |
| 1476496 | 6/1977 | United Kingdom . |
| 1566862 | 5/1980 | United Kingdom . |

Primary Examiner—Douglas C. Butler
Attorney, Agent, or Firm—Brumbaugh, Graves, Donohue & Raymond

[57] ABSTRACT

In the illustrative embodiment of the invention as described an engine bonnet is articulated to the framework of a motor car. A gas spring is articulated to both the framework and the bonnet. The gas spring balances part of the weight of the bonnet when the bonnet is to be opened by hand. In case of an accident the framework and/or the bonnet may be crushed in longitudinal direction of the car. In such case the piston rod of the gas spring is pushed inward of the cylinder beyond the normal innermost operational position and a retaining device becomes effective so as to prevent the piston rod from returning towards its outermost operational position.

20 Claims, 4 Drawing Sheets

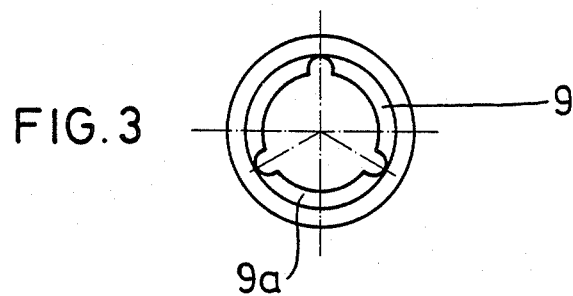
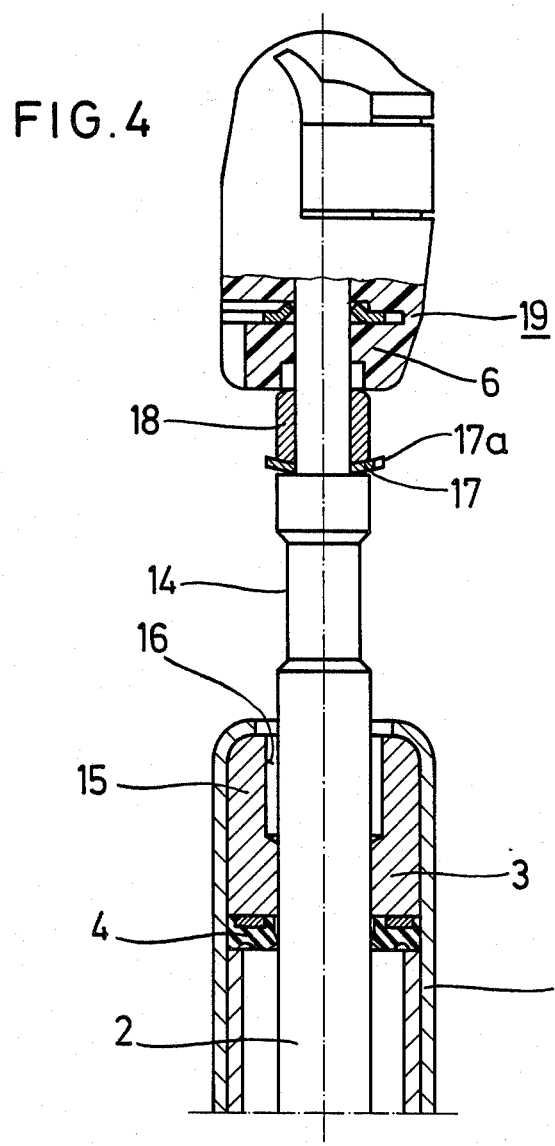

GAS SPRING FOR MOTOR VEHICLE WITH RETAINING DRIVE FOR PREVENTING PISTON ROD RETURN TOWARD ITS OPERATIONAL, OUTERMOST POSITION AFTER ACCIDENT

BACKGROUND OF THE INVENTION

The present invention is directed to a motor vehicle construction assembly. This construction assembly comprises a frame unit and a movable unit, e.g. an engine bonnet or a boot lid mounted on said frame unit for movement with respect thereto between a first and a second terminal operational position. At least part of this movement is subject to gravitational forces. At least one gas spring unit is provided fo balancing at least part of this gravitational force. The gas spring unit includes a cylinder member having an axis and two ends and defining a cavity therein. A piston rod member is sealingly guided through at least one of the ends. One of the members, namely the cylinder member and the piston rod member, is connected to one of the units, namely the frame unit and the movable unit. The other of the members is connected to the other of the units. The piston rod member is axially movable with respect to the cylinder member between a fully retracted operational position corresponding to said first terminal operational position of said movable unit and a fully extended operational position corresponding to said second terminal operational position of said movable unit. A pressurized gas contained within the cavity provides a biasing force for biasing said piston rod member towards said fully extended operational position.

Such a construction assembly is known, for example from German Offenlegungsschrift No. 26 19 176. In this known construction assembly a relatively small retaining force retains the piston rod member in its fully retracted operational position such that the biasing force acting on the piston rod member is at least partially compensated for and the gas spring exerts only small forces onto the frame unit and the movable unit when the movable unit is in its first terminal operational position. A small piston rod withdrawing force to be applied by hand is sufficient for overcoming this retaining force when the movable unit is to be moved into its second terminal operational position. After a short range of movement the retaining force ends so that the biasing force becomes fully effective for balancing the gravitational forces.

From German Offenlegungsschrift No. 28 51 366 it is known to withhold the piston rod in a position adjacent its innermost operational position after the manufacture of the gas spring so that the piston rod cannot be damaged during shipment and can easily be assembled with the frame unit and the movable unit. For withholding the piston rod in this position adjacent its innermost operational position a securing element is provided which is inserted by hand between the cylinder and the piston rod. During operation this securing element is removed.

In the known constructions no safety measures exist which could prevent a fast outward movement of the piston rod in case of an accident of the respective vehicle. Such fast outward movement can occur if e.g., the connections between the gas spring and the frame unit or the movable unit are broken. Moreover, there is no safety measure against an unintended opening of the movable unit, e.g. a bonnet, in case of an accident.

SUMMARY OF THE INVENTION

It is a primary object of the present invention to provide a motor vehicle construction assembly of the type defined before in which on substantial deformation of the frame unit or the movable unit or parts thereof no unintended extension of the gas spring can occur, particularly in case of destruction of a part of the gas spring unit.

In accordance with the present invention, the piston rod member is retractable beyond its fully retracted operational position in response to the deformation of at least one of the units, namely the frame unit and the movable unit. Biasing force compensating means are provided for compensating for the biasing force acting onto the piston rod member, said compensating means becoming effective in response to the piston rod member being retracted beyond said fully retracted operational position.

According to one preferred embodiment of this invention, the biasing force compensating means comprise one-way locking means, e.g., mechanically operative one-way locking means, interposed between the cylinder member and the piston rod member which permit a retraction movement of the piston rod member beyond the fully retracted operational position and prevent return movement of the piston rod member from a position beyond said fully retracted operational position towards said fully extended position.

These locking means may provide a high retaining force preventing a withdrawal of the piston rod member from the cylinder member, e.g., a retaining force which can be overcome only by an external withdrawing force of at least 100 kiloponds, preferably at least 300 kiloponds. So these locking means prevent unintended outward movement of the piston rod member under combined internal forces resulting from the pressurized gas and external forces occurring in case of an accident. It is to be noted that these locking means do not become effective in the fully retracted operational position of the gas spring unit and become only effective after the piston rod member has been pushed inward of the cylinder member beyond the fully retracted operational position. It is easily understood that a partial compensation of the biasing force in and adjacent the fully retracted operational position may be additionally provided as described in German Offenlegungsschrift No. 26 19 176 in view of reducing the forces exerted by the gas spring unit onto the joints connecting it to the frame unit and the movable unit. The retaining force provided by such additional retaining means and becoming effective already in the fully retracted operational position or adjacent thereof is however much smaller than the locking force provided by the locking means of this invention and can be easily overcome by the normally applied manual forces in order to move the movable unit between its terminal operational positions.

When a locking unit according to this invention is used the situation may occur that after an accident in which the piston rod member has been locked in response to an inward movement of the piston rod member beyond its fully retracted operational position it could become difficult to move the movable unit back to its second operational terminal position, e.g., to move a bonnet back to its fully opened position. In view of avoiding such difficulty it is proposed according to another aspect of this invention to provide a preset breaking point between at least one of said members, namely the cylinder member and the piston rod member on the one hand and the respective units on the other hand. So a rupture can be achieved at this preset breaking point when after an accident in which the locking means have become effective a considerable manual force is applied to the movable unit in view of moving it towards its second terminal operational position.

According to another preferred embodiment of this invention said biasing force compensating means comprise gas escape means permitting the escape of gas from said cavity in response to said piston rod member being retracted beyond said fully retracted operational position. The escape of gas in such case may be so fast that no risk is to be expected from a fast outward movement of the piston rod member in case that the gas spring unit or one of its articulation joints has been destroyed due to an accident.

BRIEF DESCRIPTION OF THE DRAWINGS

In the drawing:

FIG. 3 shows a claw spring as a detail of FIG. 2;

FIG. 4 shows a gas spring unit comprising a second embodiment of locking means;

DETAILED DESCRIPTION OF THE DRAWINGS

Figure 1:
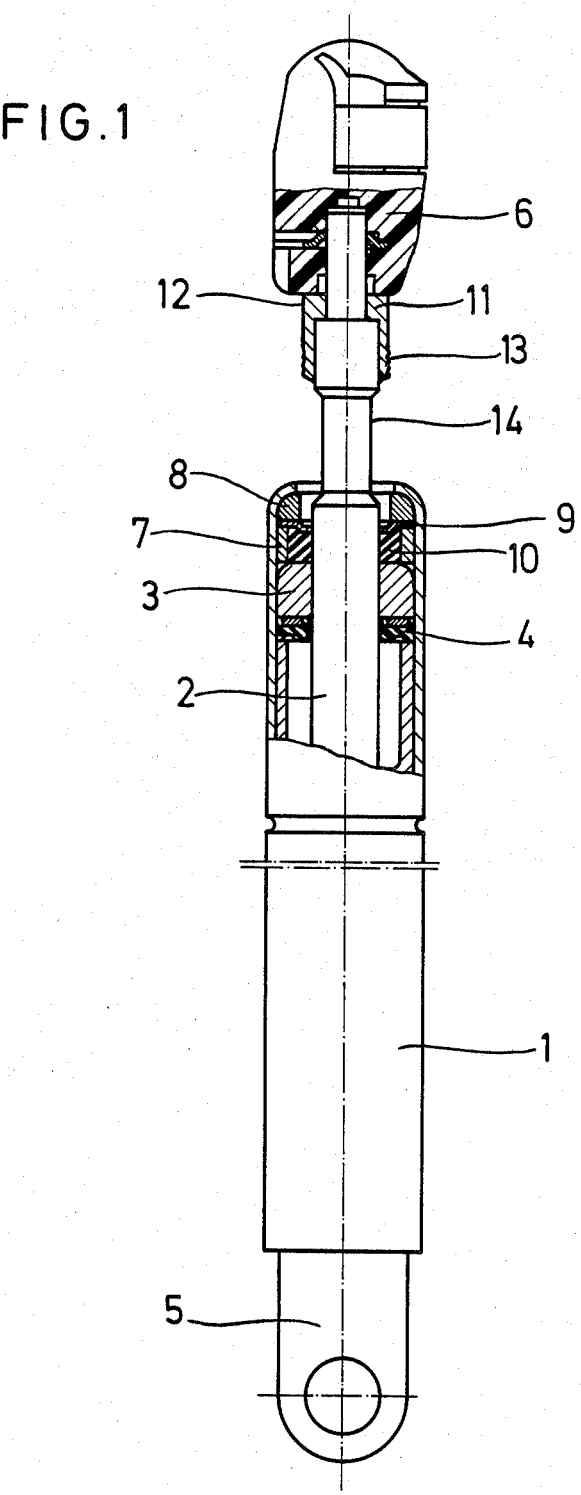
FIG. 1 shows a gas spring unit for an assembly of this invention, partially in longitudinal section.
Figure 2:
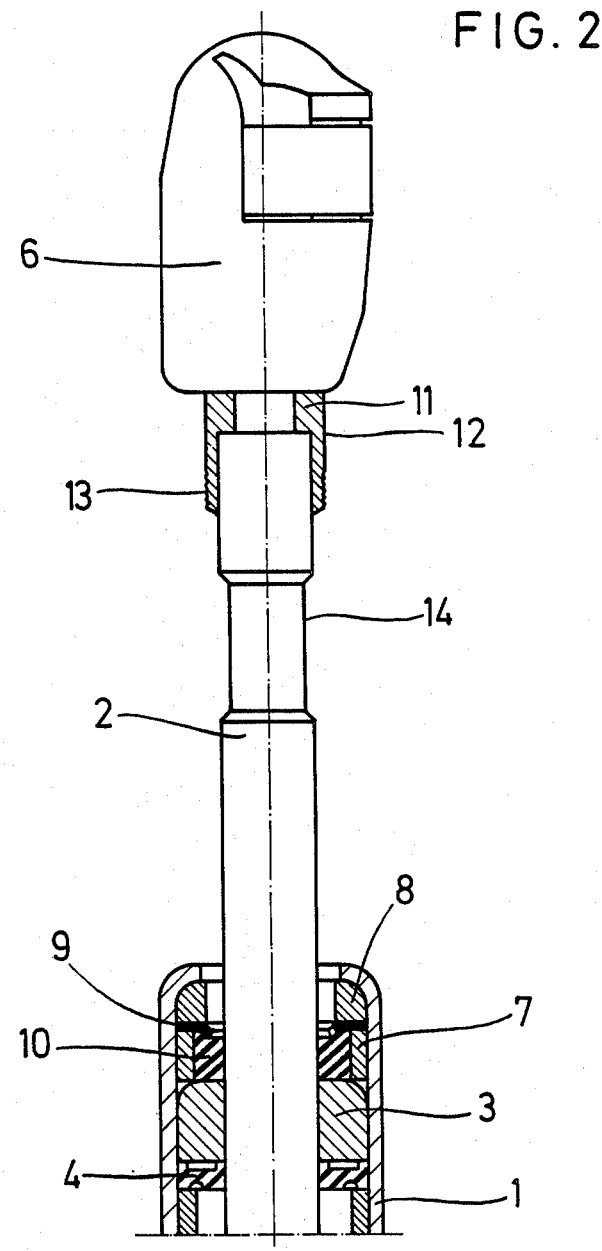
FIG. 2 shows a first embodiment of locking means for a gas spring unit according to FIG. 1.

The gas spring according to FIGS. 1 and 2 consists of the cylinder 1, the interior space of which is provided with a gas filling under pressure. Into the interior of the gas spring there extends the piston rod 2, which is guided at the piston rod exit end by means of the piston rod guide member 3 and is sealed off by the piston rod seal member 4. For the articulated connection of the gas spring with a component fast with the bodywork and with the engine bonnet or a boot lid, the articulation parts are fitted on the gas spring. According to FIG. 1 these articulation parts consist of a joint eye 5 secured to the bottom of the cylinder 1 and the ball socket 6 secured to the outer end of the piston rod. When the bonnet or boot lid is in the closed condition the gas spring assumes a nearly horizontal position (as illustrated in solid lines in FIG. 5), and in opening accompanies the pivoting movement of the bonnet or boot lid. The outward thrust force of the gas spring is determined by the product of the gas pressure in the interior of the cylinder 1 and the cross-section of the piston rod 2. Ordinarily for the damping of the piston rod movement a damper piston is secured on the piston rod 2 and has a damping action variable in response to the direction of movement.

A securing device is formed essentially by the claw spring 9 and the bush 11 arranged on the piston rod 2. This claw spring 9 is clamped in between the support ring 7 and the support ring 8 fixed by an inwardly crimped portion of the cylinder 1. The internal diameter of this claw spring 9 is larger than the diameter of the piston rod 2, but smaller than the diameter of the cylindrical outer surface formed by the bush 11. The cylindrical outer surface 12 is provided over a part of its axial length with corrugations 13 extending in the circumferential direction. So that, as from a predetermined distance of retracting the piston rod 2 into the cylinder 1 the pressurized gas filling in the cylinder interior is connected with the atmosphere, the piston rod 2 is provided with a by-pass passage which is formed by the piston rod section 14 having a smaller diameter. Between the piston rod 2 and the support ring 7 there is located a foam material ring 10 which prevents dirt from entering the otherwise free chamber as such dirt could prevent the entrance of the bush 11 in the case of a collision.

In the following description of the manner of operation substantially only the effect of the securing device will be discussed, since the manner of operation of gas springs is adequately known.

When the bonnet or boot lid is in the closed condition the piston rod 2 has been retracted into the cylinder 1. In this position there is at least a slight axial distance between the claw spring 9 and the end of the bush 11 facing the claw spring. In a crush test or an accidental collision, as a result of deformation of the section forming the crumple zone of the vehicle and by reason of the position of installation of the gas spring, the piston rod 2 is pushed axially further into the cylinder 1. Then the ends of the claw spring 9 nearer to the piston rod come into engagement with the cylindrical outer surface 12 of the bush 11. Since—as represented in FIGS. 1 to 3—the claw spring 9 has claws extending obliquely in relation to the axis of the piston rod, on pushing in of the bush 11 these claws 9a of the claw spring 9 will be bent down elastically and will slide along the corrugations 13 of the cylindrical outer face 12. An outward driving movement of the piston rod 2 is prevented by the fact that then the obliquely placed claws 9a come into claw engagement in the corrugations 13. As a further safety measure the piston rod section 13 provided with a smaller diameter overruns the piston rod seal 4, so that the pressurized gas in the interior of the cylinder 1 can flow away to atmosphere by way of this by-pass passage formed by the piston rod section 14. The above-described measures achieve the object that the pressurized gas cannot exert any outward thrust force on the piston rod, even in the case of very great deformation of the bodywork parts and of the gas spring parts. Especially when the gas spring is torn in this incident out of an articulation point or the articulation eye 5 or the ball socket 6 is torn away, no disadvantageous effect can be caused by the outward thrust force of the gas spring.

The form of embodiment according to FIG. 4 differs from that according to FIGS. 1 to 3 essentially in that the securing device is formed by a cylinder bush 15, secured in the cylinder 1 at the piston rod exit end, and a cup spring 17 secured on the piston rod 2. In the example of embodiment as illustrated this cylinder bush 15 is made in one piece with the piston rod guide 3, while for the retention of the cup spring 17 the piston rod 2 has an extension piece with small diameter and a distance bush 18 holds the cup spring 17 in the desired position. The articulation part secured on the piston rod and formed by a ball socket 6 is provided with a preset breaking point 19. This preset breaking point 19 consists of a zone of smaller wall thickness and is effective in the case of tension stressing.

In the case of this form of embodiment according to FIG. 4 again the securing device is effective only when, due to corresponding bodywork deformations, the points of articulation of the gas spring are displaced towards one another. Thus the piston rod 2 is pushed further into the cylinder 1 and the cup spring 17 slides with its external diameter on the bore 16 of the distance bush 15. In this inward movement the cup spring 17 is elastically deformed as a result of the position of installation, and then claws itself by claws 17a fast in the cylinder bush 15. In the case of an outward thrust or outward traction force the cup spring 17 would seek to increase in diameter, and presses itself with the claws 17a into the cylinder bush 15. As a result of this inward movement of the piston rod 2 into the cylinder 1 the piston rod section 14 provided with smaller diameter overruns the piston rod seal 4 and connects the interior of the cylinder 1 with atmosphere, so that the gas under pressure in the cylinder interior can flow away to atmosphere. Opening of the bonnet or boot lid is possible by reason of the preset breaking point 19, which is operative under traction loading. This preset breaking point 19 is designed so that a traction force of about a hundred kilopounds suffices to tear away the upper part of the ball socket 6. According to the installation of the gas spring with respect to the framework and the bonnet, substantially lower opening forces on the bonnet or boot lid are necessary.

Figure 5:
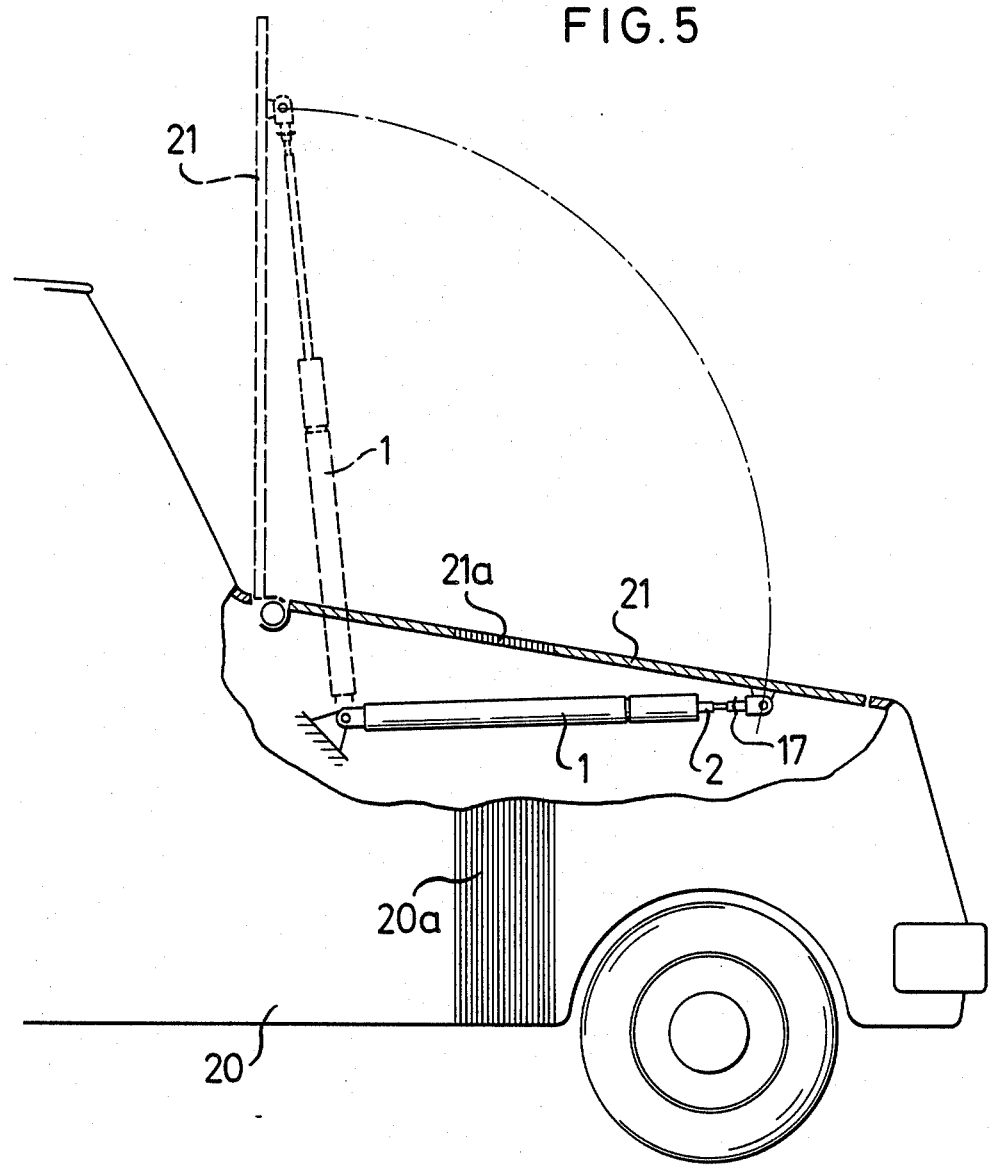
FIG. 5 shows a part of a motor vehicle constructed according to this invention and including a gas spring unit according to FIG. 4.

In FIG. 5 the framework of a motor vehicle is designated by 20 and the bonnet is designated by 21. The gas spring corresponds to the embodiment of FIG. 4. Both the framework 20 and the bonnet 21 are provided with crumple zones 20a and 21a. The gas spring is in a substantially horizontal position when the bonnet 21 is closed. In this horizontal position the piston rod 2 is in its innermost operational position with respect to the cylinder 1. In case of a frontal collision the piston rod 2 is pushed into the cylinder 1 beyond the innermost operational position as shown in FIG. 5 so that the cup spring 17 becomes effective as a locking element as fully described in connection with FIG. 4. It is easily understood that after such accident the bonnet can still be opened by an opening force exerted onto the bonnet 21 in view of the preset breaking point at 19 of FIG. 4.

It is to be noted that the gas escape bypass as provided at 14 of FIG. 4 can be used independently of the locking means represented by the cup spring 17.

It is to be noted that the gas spring unit according to this invention avoids an additional risk resulting from the pressurized gas acting onto the piston rod in case of an accident. Such risk is avoided in case of the gas spring itself being destroyed and in case of the gas spring joints being destroyed. The gas escape feature is particularly important in case of fire in which the internal pressure within the cylinder cavity could still be increased such that the cylinder could explode.

While a specific embodiment of the invention has been shown and described in detail to illustrate the application of the inventive principles, it will be understood that the invention may be embodied otherwise without departing from such principles.

The reference numerals in the claims are only for a better understanding and are by no means restrictive.

What is claimed is:

1. In a motor vehicle construction assembly comprising:
    a frame unit (20);
    a movable unit (21) mounted on said frame unit (20) for movement with respect thereto between a first and a second terminal position, at least part of such movement being subject to gravitational forces;
    at least one gas spring unit balancing at least part of said gravitational forces, said gas spring unit including
        a cylinder member (1) having an axis and two ends and defining a cavity therein and a piston rod member (2) sealingly guided through at least one of said ends,
    one (1) of said members (1, 2) being connected to one (20) of said units (20, 21), the other (2) of said members (1, 2) being connected to the other (21) of said units (20, 21), said piston rod member (2) being axially movable with respect to said cylinder member (1) between a fully retracted operational position corresponding to said first terminal operational position and a fully extended operational position corresponding to said second terminal operational position, a pressurized gas contained within said cavity providing a biasing force for biasing said piston rod member (2) towards said fully extended operational position,
    the improvement comprising:
    said piston rod member (2) being retractable beyond said fully retracted operational position in response to deformation of at least one of said units (20, 21), biasing force compensating means being provided for compensating for said biasing force in response to said piston rod member (2) being retracted beyond said fully retracted operational position.

2. A motor vehicle construction assembly as set forth in claim 1, wherein said biasing force compensating means comprise one-way locking means (12, 9) between said cylinder member (1) and said piston rod member (2), which locking means permit a retraction movement of said piston rod member (2) beyond said fully retracted operational position and prevent return movement of said piston rod member (2) from a position beyond said fully retracted operational position towards said fully extended operational position.

3. A motor vehicle construction assembly as set forth in claim 2, wherein said one-way locking means (12, 9) comprise a resilient engagement element (9) provided on one of said members (1, 2) and an engagement face (12) on the other of said members (1, 2), said resilient engagement element (9) sliding along said engagement face (12) on retraction movement of said piston rod member (2) with respect to said cylinder member (1) and preventing extending movement of said piston rod member (2) with respect to said cylinder member (1) by claw engagement with said engagement face (12).

4. A motor vehicle construction assembly as set forth in claim 3, wherein said resilient engagement element comprises a cup spring (17).

5. A motor vehicle construction assembly as set forth in claim 3, wherein said resilient engagement element comprises a claw spring (9).

6. A motor vehicle construction assembly as set forth in claim 3, wherein said engagement face is a cylindrical engagement face (12).

7. A motor vehicle construction assembly as set forth in claim 3, wherein said engagement face (12) is provided with corrugations (13) extending transversely to said axis.

8. A motor vehicle construction assembly as set forth in claim 3, wherein said resilient engagement element (17) is provided adjacent an external end portion of said piston rod member (2), and said engagement face (16) is provided by a bore of a guiding unit (3) adjacent said at least one end of said cylinder member (1), said bore (16) surrounding said piston rod member (2).

9. A motor vehicle construction assembly as set forth in claim 3, wherein said resilient engagement element (9) is provided adjacent said at least one end of said cylinder member (1) and said engagement face (12) is defined by an external cylindrical face (12) on said piston rod member (2).

10. A motor vehicle construction assembly as set forth in claim 1, said biasing force compensating means comprising gas escape means (14) permitting escape of pressurized gas from said cavity in response to said piston rod member (2) being retracted beyond said fully retracted operational position.

11. A motor vehicle construction assembly as set forth in claim 10, wherein said gas escape means comprise passage means (14) which define a by-pass across piston rod sealing means (4) provided at said at least one end of said cylinder member (1), when said piston rod member (2) is retracted beyond said fully retracted operational position.

12. A motor vehicle construction assembly as set forth in claim 11, wherein said passage means comprise a section (14) of reduced diameter of said piston rod member (2).

13. A motor vehicle construction assembly as set forth in claim 1, wherein a preset breaking point (19) is provided between at least one of said members (1, 2) and the respective unit (20, 21).

14. A motor vehicle construction assembly as set forth in claim 13, wherein said preset breaking point (19) is provided in an interconnecting element (6) between said at least one member (1, 2) and the respective unit (20, 21).

15. A motor vehicle construction assembly as set forth in claim 13, wherein said preset breaking point (19) consists of a zone of smaller wall thickness responsive to traction stress thereon.

16. A motor vehicle construction assembly as set forth in claim 1, wherein said gas spring unit (1, 2) is disposed substantially parallel with at least one crumple zone (20a, 21a) of at least one of said units (20, 31) to bridge said crumple zone.

17. A motor vehicle construction assembly as set forth in claim 1, wherein the axis of said gas spring unit (1, 2) is substantially horizontal and parallel to the drive direction of the respective vehicle when said assembly is in operational position within the respective motor vehicle.

18. A gas spring unit for a motor vehicle construction assembly having a frame unit (20) and a movable unit (21) movable between a first and second terminal position relative to said frame unit (20), said gas spring unit comprising:
a cylinder member (1) having an axis and two ends defining a cavity therein ad a piston rod member (2) sealingly guided through at least one of said ends, said members (1, 2) being provided with interconnecting elements (5, 6) for connection to one of said frame or movable units of the motor vehicle assembly, said piston rod member (2) being axially movable with respect to said cylinder member (1) between a fully retracted operational position and a fully extended operational position corresponding, respectively, to said first and second terminal positions of said movable unit (21),
a pressurized gas contained within said cavity providing a biasing force for biasing said piston rod member (2) towards said fully extended operation position,
said piston rod member (2) being retractable beyond said full retracted operational position, and
biasing force compensating means being provided for compensating for said biasing force in response to said piston rod member (2) being retracted beyond said fully retracted operational position.

19. The gas spring unit according to claim 18 wherein said biasing force compensating means comprises one-way locking means (12, 9) between said cylinder member (1) and said piston rod member (2), which locking means permit a retraction movement of said piston rod member (2) beyond said fully retracted operational position and prevent return movement of said piston rod member (2) from a position beyond said fully retracted operational position towards said fully extended operational position.

20. The gas spring unit according to claim 18 wherein said biasing force compensating means comprises gas escape means (14) permitting escape of pressurized gas from said cavity in response to said piston rod member (2) being retracted beyond said fully retracted operational position.

* * * * *

UNITED STATES PATENT AND TRADEMARK OFFICE
CERTIFICATE OF CORRECTION

PATENT NO. : 4,779,845

DATED : October 25, 1988

INVENTOR(S) : Bartesch et al.

It is certified that error appears in the above-identified patent and that said Letters Patent is hereby corrected as shown below:

```
Col. 1, line 15, "fo" should read --for--;
Col. 2, line 34, "kiloponds" should read --kilopounds--;
Col. 2, line 35, "kiloponds" should read --kilopounds--;
Col. 6, line 67, "(16)" should read --(12)--;
Col. 8, line 9, "ad" should read --and--;
Col. 8, line 23, "operation" should read --operational--.
```

Signed and Sealed this

Tenth Day of October, 1989

Attest:

DONALD J. QUIGG

Attesting Officer

Commissioner of Patents and Trademarks